(12) United States Patent
Carter

(10) Patent No.: US 6,553,669 B2
(45) Date of Patent: *Apr. 29, 2003

(54) PIPE CUTTER AND METHOD OF CUTTING PIPE

(76) Inventor: Sam W. Carter, 4170 Indian Hills Tr., West Branch, MI (US) 48661

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 100 days.

(21) Appl. No.: 08/888,653

(22) Filed: Jul. 7, 1997

(65) Prior Publication Data

US 2001/0015119 A1 Aug. 23, 2001

(51) Int. Cl.[7] .............................. B26D 7/01; B23D 49/16
(52) U.S. Cl. .............................. 30/92; 30/371; 83/454; 83/574; 83/743; 83/758; 269/5; 269/268
(58) Field of Search ........................ 30/92, 373, 374, 30/93, 94, 95, 96, 97, 101, 102, 371, 372; 83/54, 753, 758, 452, 454, 455, 467.1, 468.1, 468.4, 574

(56) References Cited

U.S. PATENT DOCUMENTS

| 466,929 | A | * | 1/1892 | Lanfair | 30/452 |
|---|---|---|---|---|---|
| 793,796 | A | * | 7/1905 | Mummert | 83/455 |
| 1,802,914 | A | * | 4/1931 | Gruber | 269/207 |
| 2,568,791 | A | * | 9/1951 | Cooper | 30/374 X |
| 3,449,992 | A | * | 6/1969 | Hanaway | 83/574 X |
| 3,481,374 | A | * | 12/1969 | Schindler | 30/373 |
| 3,763,733 | A | * | 10/1973 | Jambor | 83/753 X |
| 3,805,383 | A | * | 4/1974 | McNally | 30/92 |
| 3,834,019 | A | * | 9/1974 | Smeltzer et al. | 30/92 |
| 4,051,597 | A | * | 10/1977 | Cardoza | 30/373 |
| 4,566,190 | A | * | 1/1986 | Isakson | 30/373 |
| 4,821,414 | A | * | 4/1989 | Ducret | 30/92 X |
| 4,876,793 | A | * | 10/1989 | Quaglia | 30/373 X |
| 5,179,781 | A | * | 1/1993 | Weaver | 30/92 |
| 5,509,440 | A | * | 4/1996 | Cantaloube et al. | 30/94 X |
| 5,611,146 | A | * | 3/1997 | Ducret | 30/92 |
| 5,632,089 | A | * | 5/1997 | Sakamoto et al. | 30/92 |
| 5,737,990 | A | * | 4/1998 | Freeland et al. | 83/574 X |
| 5,806,187 | A | * | 9/1998 | Ducret | 30/92 |

* cited by examiner

*Primary Examiner*—Clark F. Dexter
(74) *Attorney, Agent, or Firm*—Reising, Ethington, Barnes, Kisselle, Learman & McCulloch, P.C.

(57) ABSTRACT

The pipe cutter includes a jigsaw with a motor that reciprocates a saw blade back and forth. A way is clamped to the jigsaw. A workpiece holder is slidably mounted on the way. The workpiece holder has a workpiece slot with a base, two side walls and a saw blade slot. A handle is attached to the workpiece holder. A pipe that is to be cut is placed in the workpiece slot and the workpiece holder is moved along the way toward the saw blade. The saw blade forces the pipe toward the base of the workpiece slot and cuts the pipe.

14 Claims, 3 Drawing Sheets

PIPE CUTTER AND METHOD OF CUTTING PIPE

TECHNICAL FIELD

This invention relates to a pipe cutter and more particularly to a portable power saw for cutting pipe and rods.

BACKGROUND OF THE INVENTION

Copper tubing, plastic pipe and electric conduits are generally cut by a hand saw or by a pipe cutter tool with two guide rollers and a cutting disk that is advanced toward the pipe and the two rollers and is rotated about the axis of the pipe to sever the pipe. Both of these pipe cutting procedures are slow and require substantial physical effort.

The handsaw that is commonly used is a hacksaw. Hacksaws have a thin steel blade held in a frame and subjected to a tension load. These saws are difficult to guide accurately to form a straight cut. Cuts that are perpendicular to a pipe center line are desirable when attaching a pipe to a coupling. If the coupling is threaded, the end of the pipe that is inserted into the coupling must also be threaded. To cut good threads on a pipe, the end of the pipe must be perpendicular to the pipe center line. If the end is not perpendicular the threads may be crooked. A coupling that is connected by solder or adhesives usually includes a flange or stop members that limit penetration of the pipe into the coupling. If the end of the pipe is not perpendicular to the axis of the pipe, the pipe will not seat properly in the coupling.

Hack saw blades have small closely spaced teeth to cut material. These blades remove small particles of material on each cutting stroke and are therefore slow. It can take several minutes to cut one pipe. Even an exceptionally strong person can only cut a limited number of pipes per day due to the force and time required to make each cut.

The pipe cutters that have two rollers and a cutting disk generally work well and require minimal force from the operator. If the axis of the cutting disk is not parallel to the axis of the two rollers, the cutting disk will tend to form a spiral groove and move along the axis of the pipe. A more serious problem that occurs, even when the cutting disk is working properly, is a reduction in the inside diameter of the pipe where the pipe is cut. This reduction in the inside diameter of a cut fluid conveying pipe reduces flow rate and increases the pressure drop along the length of the system when fluid is flowing. The reduced inside diameter in electrical conduit increases the difficulty of pulling wire through the pipe. The ends of the pipe sections with reduced internal diameter have a sharp edge which can damage or even destroy the insulation covering on electrical wiring. The sharp edge can be eliminated with a reamer but the reduced diameter cannot be easily restored to the original diameter. This makes it more difficult to pull electrical wires through the pipe and reduces the number or the size of the wires that can be received in the pipe.

SUMMARY OF THE INVENTION

An object of the invention is to provide a power saw for cutting pipe.

Another object of the invention is to provide a power saw with a guide for restraining a pipe while it is cut.

A further object of the invention is to provide an attachment for a jigsaw that guides a jigsaw blade while cutting a pipe.

The pipe cutter includes a motor driven jigsaw with a saw blade that is reciprocated back and forth. A way member is clamped to the jigsaw by fasteners. A workpiece holder with a workpiece slot is slidably mounted on the way. Stops limit movement of the workpiece holder relative to the way.

The workpiece holder can be provided with multiple workpiece slots to accommodate pipes with different diameters. A handle is attached to the workpiece holder for moving the workpiece holder relative to the way. The handle has a pipe contact surface which cooperates with the workpiece slot to hold a pipe perpendicular to the path of movement of the workpiece holder.

The workpiece holder is slideably mounted on the way. A workpiece slot is provided in the workpiece holder for a pipe of the diameter of that which is to be cut. A pipe that is to be cut is inserted into the workpiece slot. The workpiece holder is then advanced toward the saw blade. The force exerted to hold the saw blade in contact with the pipe being cut urges the pipe into contact with the bottom or base of the workpiece slot.

DESCRIPTION OF THE PREFERRED EMBODIMENT

Figure 1:
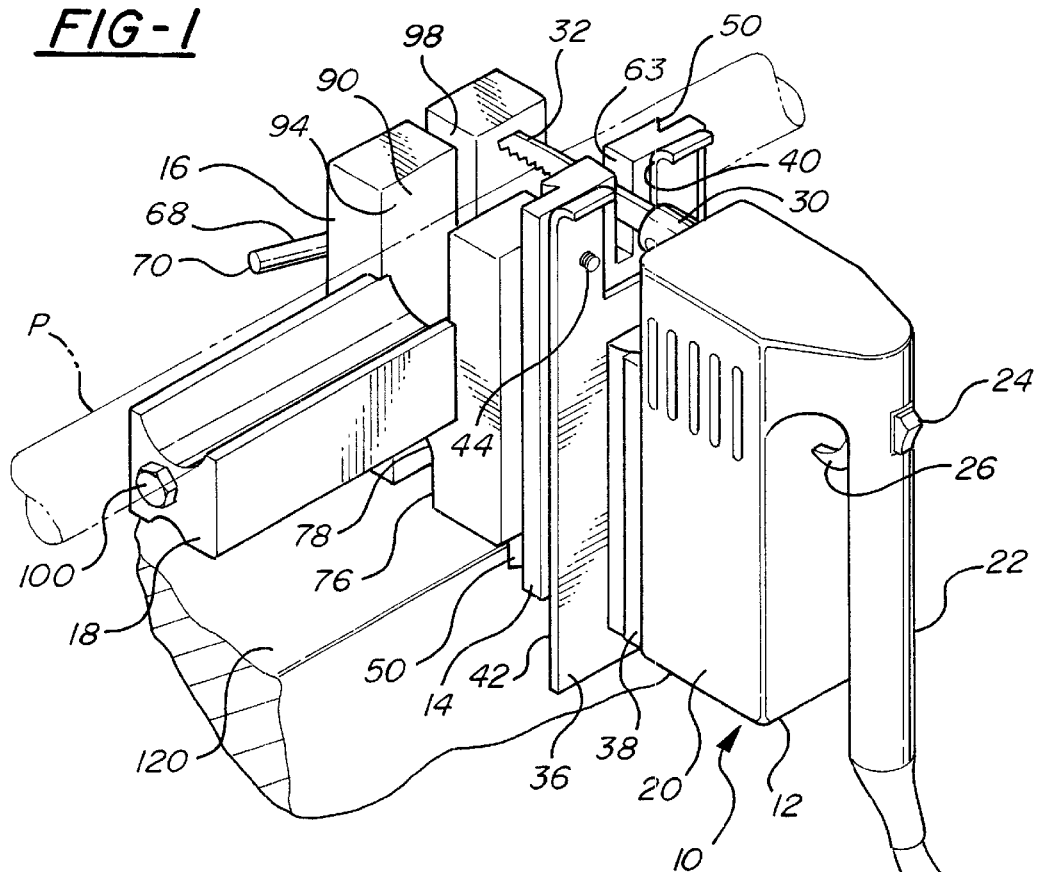
FIG. 1 is a perspective view of the pipe cutter.

The pipe cutter generally designated by the reference number 10 includes a jigsaw 12, a way 14, a workpiece holder 16 and a workpiece holder handle 18.

The jigsaw 12 is a standard electric powered jigsaw with a motor and drive housing 20. A handle 22 is integral with the housing 20. Switches 24 and 26 are mounted in the handle 20 and can be operated with the thumb and index finger to turn the motor on and off. An electric power cord 28 has an end (not shown) connected to an electric receptacle to supply power to run the electric motor in the housing 20. The jigsaw 12 could also be powered by a rechargeable battery. When the jigsaw 12 is running the driven shaft 30 reciprocates in and out of the housing 20. A saw blade 32 is received in a slot in the shaft 30 and clamped in place by a screw 34. The saw blade 32, when cutting metal should have at least 21 teeth per inch and should make at least 3,000 strokes per minute to make a good cut.

A shoe plate 36 is rigidly secured to a mounting block assembly 38. The mounting block assembly 38 is secured to the housing 20. The saw blade 32 extends through a slot 40 in the shoe plate 36. Shoe plates 36 are generally pivotally adjustable about an axis parallel to the longitudinal axis of the shoe plate. When the jigsaw 12 is used as part of a pipe cutter 10, the shoe plate 36 is locked in a position in which the contact surface 42 is perpendicular to the drive shaft 30.

Figure 3:
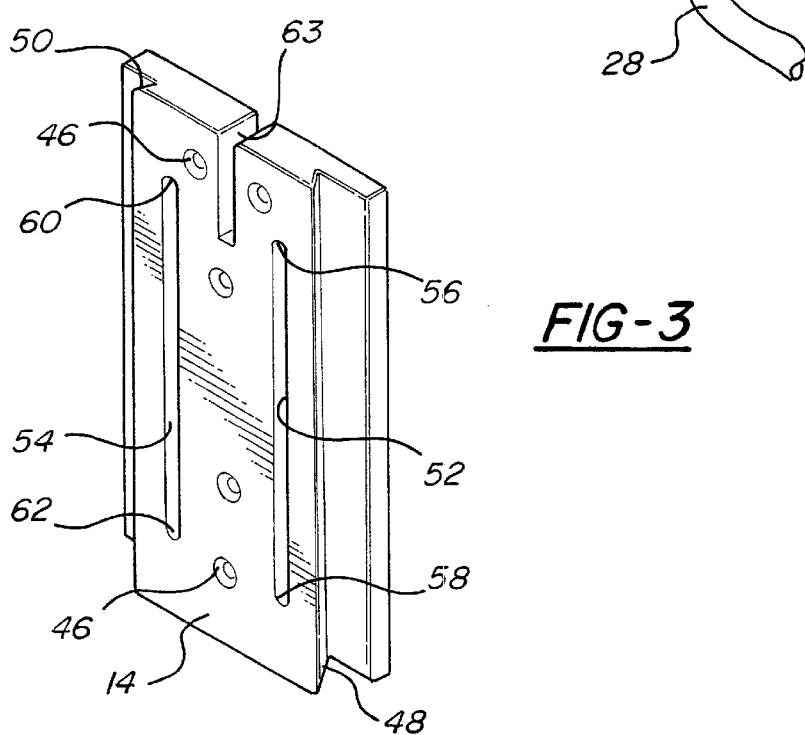
FIG. 3 is a perspective view of the way.
Figure 2:
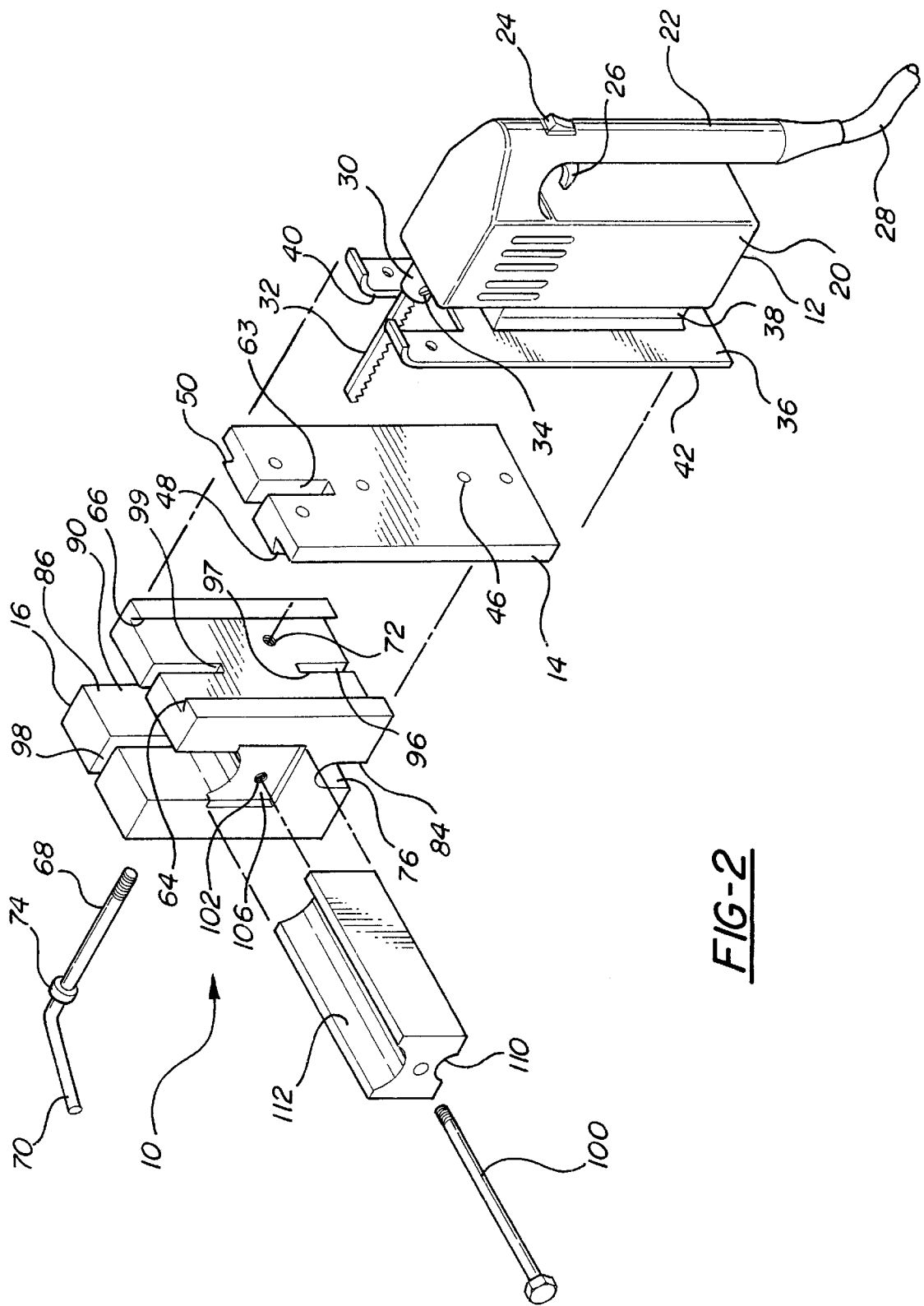
FIG. 2 is an expanded view of the pipe cutter attachment and electric jigsaw.
Figure 4:
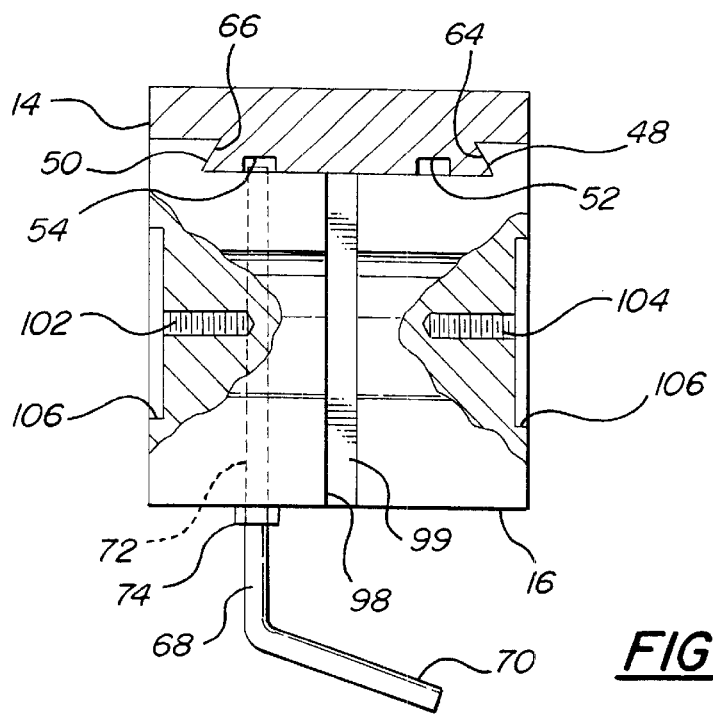
FIG. 4 is an enlarged top plan view of the workpiece holder with parts broken away and a sectional view of the way.

The way 14 is a generally flat plate wherein a first side of the way 14 is secured to the contact surface 42 of the shoe plate 36 by a plurality of mechanical fasteners 44. These fasteners pass through bores 46 through the way 14. Machined surfaces 48 and 50 form a tenon of a dovetail joint. Two parallel grooves 52 and 54 are machined into the way 14 as shown in FIGS. 3 and 4. The groove 52 has ends 56 and 58. The groove 54 has ends 60 and 62. The function of the grooves 52 and 54 is explained below. A saw blade slot 63 is provided in one end of the way 14 so that portions of the way can extend along each side of saw blade 32.

The workpiece holder 16 is a block of material with parallel surfaces 64 and 66 that form the walls of a mortise. The mortise of the workpiece holder 16 is slid over the tenon of the way 14 to slideably connect the workpiece holder to a second slide of the way. As shown in FIG. 4, the surface 50 on the way 14 is in sliding contact with the surface 66 on the workpiece holder 16 and the surface 48 on the way is in sliding contact with the surface 64 on the workpiece holder. A threaded pin member 68 with a handle 70 screws in a threaded bore 72 into the workpiece holder 16. As shown in FIG. 4, the pin member 68 extends into the groove 54 where it leaves the workpiece holder 16 free to slide relative to the way 14 and where it engages the ends 60 and 62 of the groove to limit movement of the workpiece holder 16 relative to the way 14. The pin member 68 can be rotated by the handle 70 and withdrawn from the groove 54. Once the pin member 68 is withdrawn from the groove 54, the workpiece holder 16 can be slid off the way 14 rotated 180° and slid back onto the way. The pin member 68 is then rotated until it extends into the groove 52 where it can contact the ends 56 and 58 of the groove to limit sliding movement of the workpiece holder 16 relative to the way 14. In this new position, the surface 64 on the workpiece holder 16 is in sliding contact with the surface 50 on the way 14 and the surface 66 on the workpiece holder is in sliding contact with the surface 48 on the way. The nut 74 on the pin member 68 is tightened to lock the pin in selected positions.

A first workpiece slot 76 is formed in one end of the workpiece holder 16. The slot 76 has a base 78, sidewalls 80 and 82 and an open side 84. The sidewalls 80 and 82 are spaced apart a distance slightly in excess of the outside diameter of the pipe P to be cut. Pipes P are frequently an oval shape rather than round. It may therefore be necessary to rotate the pipe P about its axis to a position in which the pipe can freely slide between the sidewalls 80 and 82 and contact the base 78.

A second workpiece slot 86 is formed in another end of the workpiece holder 16. The slot 86 has a base 88, sidewalls 90 and 92 and an open side 94. The sidewalls 90 and 92 are spaced apart slightly more than the outside diameter of a pipe P to be cut. As shown in the drawing the second workpiece slot 86 is for a pipe P with a larger diameter than the pipe received in the workpiece slot 76.

A standard jigsaw 12 can accommodate pipe P with diameters up to four inches. The workpiece holder 16 can be provided with workpiece slots that will receive pipe of any diameter that the jigsaw 12 can handle. More than one workpiece holder 16 can be employed with one jigsaw 12 and way 14 to accommodate a larger number of pipe sizes. It would also be possible to design a workpiece holder 16 with more than two workpiece slots.

Saw blade slots 96 and 98 with saw blade slot bases 97 and 99 are provided in the workpiece holder 16 for the passage of the saw blade 32 when cutting a pipe P. These saw blade slots 96 and 98 are perpendicular to the axis of a pipe P that is to be cut. The sawblade slots 96 and 98 extend into the workpiece holder 16 a little past the base 78 or 88 of the workpiece slot 76 or 86. The stops provided by the pin member 68 and the ends walls 56, 58, 60 and 62 of the grooves 52 and 54 prevent the sawblade 32 from contacting the workpiece holder 16 and allow the sawblade to move out of the workpiece slots 76 and 86 a distance sufficient to allow pipes P to be inserted into the workpiece slots.

A handle 18 is attached to the workpiece holder 16 by a bolt 100 that screws into a bore 102 or 104 in the workpiece holder 16. Recesses 106 and 108 in the side of the workpiece holder 16 receive the base portion of the handle 18 and keep the handle from rotating about the axis of the bolt 100. Pipe contact surfaces 110 and 112 on the handle 18 cooperate with the base 78 or 88 of the workpiece slots 76 or 86 to position a pipe P for cutting. If the diameter of the pipe P is not too large, the pipe can be manually held in position for cutting when grasping the handle 18.

Figure 5:
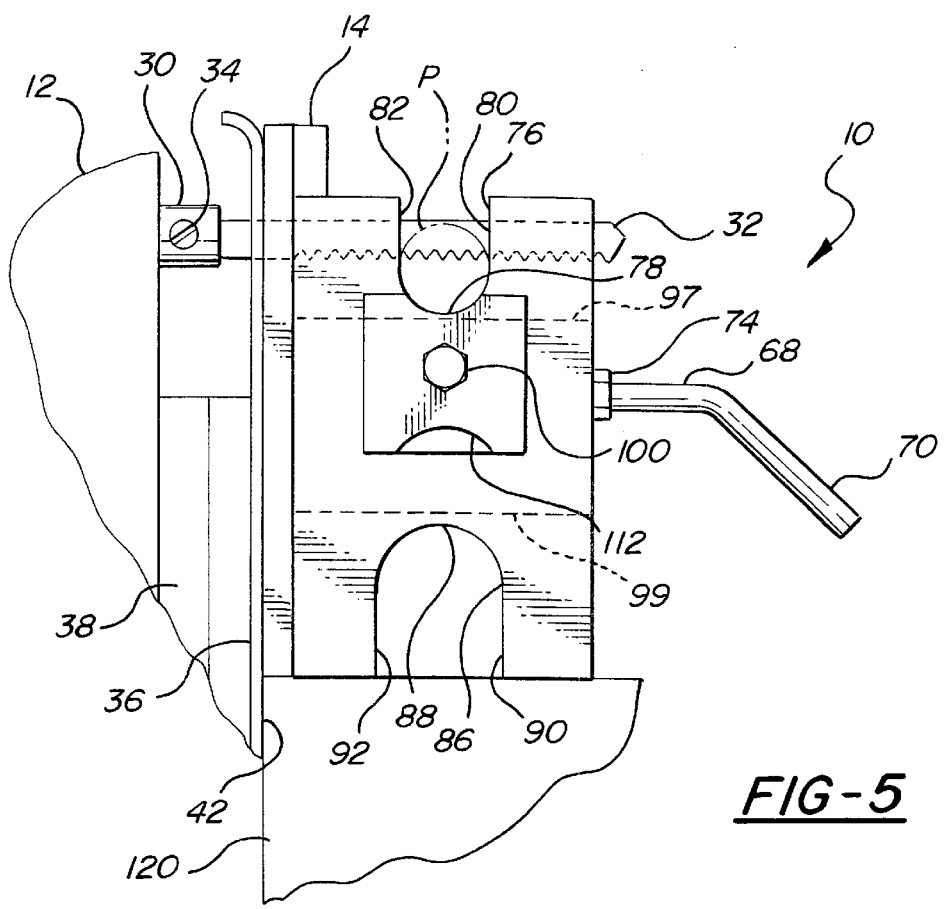
FIG. 5 is a side elevational view of the pipe cutter in operation with portions of the jigsaw broken away.

To cut a pipe P with the pipe cutter 10, the workpiece holder 16 is mounted on the way 14 with a workpiece slot 76 or 86, that corresponds to the size of the pipe to be cut, adjacent to the sawblade. The workpiece holder 16 is then slid away from the sawblade to a position which provides sufficient space for the pipe to be inserted into the workpiece slot 76 or 78. The pipe P is then inserted into the workpiece slot 76 or 78. Pipe P is then rotated if necessary and moved into contact with the base 78 or 88 of the workpiece slot 76 or 86 and the pipe contact surface 110 or 112 on the handle 18. The switch 26 is then turned on, the pipe P and the handle 18 are held by the operator of the pipe cutter 10 and the workpiece holder 16 is moved relative to the way 14 toward the sawblade 32. It can be helpful to sit the workpiece holder 16 on a bench or block 120 as shown in FIGS. 1 and 5 and apply pressure to force the sawblade 32 toward the pipe P. Whether pressure is applied through the handle 18 or a support block 120, pressure on the i15 sawblade 32 will tend to hold the pipe P against the base 78 or 88 of the workpiece slot 76 or 86. Once the sawblade 32 saws through the pipe P, the jigsaw 12 can be turned off. The two pieces of cut pipe are removed from the workpiece holder 16. A second cut is made by sliding the workpiece holder 16 away from the sawblade 32 and repeating the procedures set forth above.

Jigsaws 12 have reciprocating sawblades 32. The parts connected to the jigsaw 12 to make it a pipe cutter 10 could also be connected to a saw with a rotating sawblade.

The ends 56, 58, 60 and 62 of the grooves 52 and 54 and the pin member 68 could be replaced by a variety of stops that perform the same function. For example, a fixed stop could be attached to the way 14 that would limit travel of the workpiece holder 16 relative to the way 14.

A dovetail joint for slidably connecting the workpiece holder 16 to the way 14 could be replaced by various track systems. There could for example be tongues or pins on one member that project into grooves or slots in another member.

The disclosed embodiment is representative of a presently preferred form of the invention, but is intended to be illustrative rather than definitive thereof. The invention is defined in the claims.

I claim:

1. A pipe cutter comprising a power saw with a reciprocating saw blade;

a way secured to the saw;

a workpiece holder slideably mounted on a first side of the way and having a workpiece slot with a base, an open side opposite the base for workpiece ingress and egress, and two sidewalls that are fixed relative to the base and cooperable with the base to position a workpiece, the workpiece holder further having a saw blade slot that intersects the workpiece slot and is generally perpendicular to the workpiece slot, wherein the way extends between the workpiece holder and the saw such that the workpiece holder is disposed on the first side of the way and a substantial portion of the saw is disposed on an opposite second side of the way, wherein the reciprocating saw blade extends through the way from the second side to the first side thereof and is extendable through the saw blade slot, and wherein the reciprocating saw blade moves from the open side of the workpiece slot toward the base of the workpiece slot to initiate cutting; and a handle attached to the workpiece holder for moving the workpiece holder along the way.

2. A pipe cutter as set forth in claim 1 wherein the power saw is a jigsaw and the reciprocating saw blade is reciprocated back and forth.

3. A pipe cutter as set forth in claim 1, wherein the handle has a workpiece contact surface that is aligned with the base of the workpiece slot to hold a workpiece perpendicular to the saw blade.

4. A pipe cutter comprising a power saw with a reciprocating saw blade;

a way rigidly secured to the saw;

a workpiece holder slideably mounted on a first side of the way and having a workpiece slot with a base, an open side opposite the base, and two sidewalls that are fixed relative to the base and cooperate with the base to position a workpiece, the workpiece holder further having a saw blade slot that intersects the workpiece slot and is generally perpendicular to the workpiece slot, wherein the way extends between the workpiece holder and the saw such that the workpiece holder is disposed on the first side of the way and a substantial portion of the saw is disposed on an opposite second side of the way, wherein the reciprocating saw blade extends through the way from the second side to the first side thereof and is extendable through the saw blade slot;

a first stop including a first pair of cooperating surfaces carried by the way and the workpiece holder which contact each other to limit movement of the workpiece holder along the way in a first direction;

a second stop including a second pair of cooperating surfaces carried by the way and the workpiece holder which contact each other to limit movement of the workpiece holder relative to the way in a second direction; and a handle on the workpiece holder for moving the workpiece holder along the way.

5. A pipe cutter as set forth in claim 4 wherein the first stop includes a retainer groove with a first end and a pin that extends into the retainer groove and contacts the first end of the retainer groove to limit movement of the workpiece holder relative to the way in a first direction.

6. A pipe cutter as set forth in claim 5 wherein said retainer groove has a second end which cooperates with the pin that extends into the retainer groove to form the second stop and wherein the pin contacts the second end of the retainer groove to limit movement of the workpiece holder relative to the way in a second direction.

7. A pipe cuter as set forth in claim 4 wherein the second stop includes a retainer groove with a second end and a pin that extends into the retainer groove and contacts the second end of the retainer groove to limit movement of the workpiece holder relative to the way in a second direction.

8. A pipe cutter as set forth in claim 4 wherein the first stop permits the workpiece holder to move to a position in which the saw blade is outside the saw blade slot and spaced from the open side of the workpiece slot.

9. A pipe cutter as set forth in claim 4 wherein the second stop includes a surface on the way which blocks movement of the workpiece holder in a second direction thereby preventing movement of the saw blade into contact with the workpiece holder.

10. A pipe cutter as set forth in claim 4 wherein the powersaw is a jigsaw and the reciprocating saw blade is reciprocated back and forth.

11. A pipe cutter as set forth in claim 4 wherein the workpiece holder has a plurality of workpiece slots and the workpiece holder can be reversed and slidably mounted on the way with the second workpiece slot in a position to cooperate with the saw blade.

12. A pipe cutter as set forth in claim 11 wherein the handle is attachable to the workpiece holder in any one of a plurality of positions.

13. A pipe cutter as set forth in claim 12 wherein the handle has a workpiece contact surface that cooperates with the base of the workpiece slot in the workpiece holder to align the workpiece relative to the saw blade.

14. A pipe cutter as set forth in claim 4, wherein the handle has a workpiece contact surface that is aligned with the base of the workpiece slot to hold a workpiece perpendicular to the saw blade.

* * * * *